(12) United States Patent
Noguchi (10) Patent No.: US 8,866,917 B2
(45) Date of Patent: Oct. 21, 2014

(54) OPTICAL APPARATUS AND CONTROL METHOD THEREFOR

(75) Inventor: Masaaki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 13/287,652

(22) Filed: Nov. 2, 2011

(65) Prior Publication Data

US 2012/0154615 A1 Jun. 21, 2012

(30) Foreign Application Priority Data

Dec. 15, 2010 (JP) .................................. 2010-279876

(51) Int. Cl.
*H04N 5/228* (2006.01)
*H04N 5/232* (2006.01)

(52) U.S. Cl.
CPC .... H04N 5/23258 (2013.01); *G03B 2205/0015* (2013.01); *G03B 2217/005* (2013.01)
USPC .................................................. 348/208.11

(58) Field of Classification Search
CPC .......... H04N 5/23248; H04N 5/23287; H04N 5/23258
USPC ........ 348/208.99, 208.1, 208.2, 208.3, 208.4, 348/208.5, 208.7, 208.8, 208.11
See application file for complete search history.

(56) References Cited

U.S. PATENT DOCUMENTS

| | | | |
|---|---|---|---|
| 6,208,810 B1* | 3/2001 | Imada | 396/55 |
| 2003/0053803 A1* | 3/2003 | Washisu | 396/55 |
| 2009/0160958 A1* | 6/2009 | Yamada et al. | 348/208.99 |
| 2010/0172639 A1* | 7/2010 | Ohishi | 396/55 |
| 2011/0043646 A1* | 2/2011 | Watanabe et al. | 348/208.4 |
| 2011/0273572 A1* | 11/2011 | Tsuchida | 348/208.4 |

FOREIGN PATENT DOCUMENTS

| | | |
|---|---|---|
| JP | 2006-047742 | 2/2006 |
| JP | 2009-047757 A | 3/2009 |

OTHER PUBLICATIONS

Japanese Office Action, which is enclosed without an English Translation, that issued in Japanese Patent Application No. 2010-279876.

* cited by examiner

*Primary Examiner* — Lin Ye
*Assistant Examiner* — Chriss Yoder, III
(74) *Attorney, Agent, or Firm* — Cowan, Liebowitz & Latman, P.C.

(57) ABSTRACT

An optical apparatus includes a compensation unit compensating for a blur in an image formed by an imaging optical system, a shake detection unit detecting a shake of the apparatus, a position detection unit detecting a position of the compensation unit, wherein the position detection unit comprising variable detection accuracy, a driving control unit calculating a drive target position of the compensation unit based on a shake amount and the position of the compensation unit, a driving unit driving the compensation unit to the drive target position, a switching determination unit determining whether or not to perform switching of the detection accuracy of the position detection unit, and a control unit controlling the detection accuracy such that the detection accuracy is increased during moving image capture in a case where it is determined to perform switching of the detection accuracy of the position detection unit.

7 Claims, 6 Drawing Sheets

HALL OFFSET ADJUSTMENT

FIG. 3B

HALL GAIN ADJUSTMENT

OPTICAL APPARATUS AND CONTROL METHOD THEREFOR

BACKGROUND OF THE INVENTION

1. Field of the Invention

The present invention relates to an optical apparatus and a control method therefor, and in particular, relates to an optical apparatus having a camera shake compensation function and a control method therefor.

2. Description of the Related Art

An optical apparatus, such as a digital camera, that includes a shake compensation device for detecting shakes of the optical apparatus and driving a movable imaging lens so as to compensate for image blurs due to the shakes is known. In more recent years, a technique for widening the range of image stabilization on the wide-angle end side during moving image recording and thereby enhancing the effect of camera shake compensation for large camera shakes, for example, when shooting while walking, has also become known (an image stabilization apparatus compensates for a higher degree of camera shake, such as when shooting while walking, and is more effective as the zoom approaches full wide angle; this is hereinafter referred to as a "large-shake image-stabilization dynamic mode").

Also, an optical apparatus that performs compensation control for large camera shake is disclosed in, for example, Japanese Patent Laid-Open No. 2006-47742.

However, with the conventional technique disclosed in the aforementioned Japanese Patent Laid-Open No. 2006-47742, if the range of motion is enlarged in accordance with orientation in which an optical apparatus is held while shooting, the driving resolution of a shift lens decreases. In an imaging device that is capable of both moving image capture and still image capture, the influence of the decrease in the driving resolution is particularly evident as deterioration in the camera shake compensation effect in the case of capturing still images that require higher resolutions. In addition, from the viewpoint of optical lens properties, there are concerns about reduced image quality such as degradation in the resolution of still images in the case where the range of motion of the shift lens is enlarged.

SUMMARY OF THE INVENTION

The present invention has been achieved in light of the above-described problems, and aims to achieve both camera shake suppression effects and prevention of deterioration in image quality during both moving image capture and still image capture.

According to a first aspect of the present invention, there is provided an optical apparatus including a compensation unit configured to compensate for a blur in an image formed by an imaging optical system, a shake detection unit configured to detect a shake of the apparatus, a position detection unit configured to detect a position of the compensation unit, wherein the position detection unit comprising variable detection accuracy, a driving control unit configured to calculate a drive target position of the compensation unit based on a shake amount that is output from the shake detection unit and the position of the compensation unit, a driving unit configured to drive the compensation unit to the drive target position, a switching determination unit configured to determine whether or not to perform switching of the detection accuracy of the position detection unit, and a control unit configured to control the detection accuracy of the position detection unit such that in a case where the switching of the detection accuracy is determined to be performed, wherein the detection accuracy is increased during moving image capture.

According to a second aspect of the present invention, there is provided an optical apparatus including a compensation unit configured to compensate for a blur in an image formed by an imaging optical system. The optical apparatus has a first mode in which the compensation unit is movable in a predetermined range, and a second mode in which the compensation unit is movable in a narrower range than in the first mode. The optical apparatus further includes a shake detection unit configured to detect a shake of the apparatus, a position detection unit configured to detect a position of the compensation unit, wherein the position detection unit capable of switching between first detection accuracy and second detection accuracy that is higher than the first detection accuracy, a driving control unit configured to calculate a drive target position of the compensation unit based on a shake amount that is output from the shake detection unit and the position of the compensation unit, a driving unit configured to drive the compensation unit to the drive target position, a switching determination unit configured to determine whether or not to perform switching of the detection accuracy of the position detection unit, and a control unit configured to control the detection accuracy such that in a case where the compensation unit is driven in the first mode, the position of the compensation unit is detected with the first detection accuracy, and in a case where the switching determination unit determines to perform switching of the detection accuracy, the position of the compensation unit is detected with the second detection accuracy even if the compensation unit is driven in the first mode.

According to a third aspect of the present invention, there is provided an optical apparatus that changes shake compensation control depending on whether the optical apparatus is in a moving image capturing mode or in a still image capturing mode. The optical apparatus includes a compensation unit configured to compensate for a blur in an image formed by an imaging optical system, wherein the compensation unit being movable in a predetermined range when in moving image capturing mode and being movable in a narrower range than in the moving image capturing mode when in still image capturing mode, a shake detection unit configured to detect a shake of the apparatus, a position detection unit configured to detect a position of the compensation unit, the position detection unit capable of switching between first detection accuracy and second detection accuracy that is higher than the first detection accuracy, a driving control unit configured to calculate a drive target position of the compensation unit based on a shake amount that is output from the shake detection unit and the position of the compensation unit, a driving unit configured to drive the compensation unit to the drive target position, a switching determination unit configured to determine whether or not to switch the detection accuracy of the position detection unit, and a control unit configured to control the detection accuracy such that in the moving image capturing mode, the position of the compensation unit is detected with the first detection accuracy, and in a case where the switching determination unit determines to perform switching of the detection accuracy, the position of the compensation unit is detected with the second detection accuracy even if image capturing is performed in the moving image capturing mode.

According to a fourth aspect of the present invention, there is provided a method for controlling an optical apparatus that includes a compensation unit configured to compensate for a blur in an image formed by an imaging optical system. The method includes detecting a shake of the apparatus, detecting a position of the compensation unit with variable detection accuracy, calculating a drive target position of the compensation unit based on a shake amount that is an output of the detected shake and the detected position of the compensation unit, driving the compensation unit to the drive target position, determining whether or not to perform switching of the detection accuracy in position detection, and controlling the detection accuracy such that the detection accuracy is increased during moving image capture in a case where it is determined to perform switching of the detection accuracy in position detection.

According to a fifth aspect of the present invention, there is provided a method for controlling an optical apparatus that includes a compensation unit configured to compensate for a blur in an image formed by an imaging optical system, the optical apparatus comprising a first mode in which the compensation unit is movable in a predetermined range and a second mode in which the compensation unit is movable in a narrower range than in the first mode. The method includes detecting a shake of the apparatus, detecting a position of the compensation unit with detection accuracy that is switchable between a first detection accuracy and a second detection accuracy that is higher than the first detection accuracy, calculating a drive target position of the compensation unit based on a shake amount that is an output of the detected shake and the position of the compensation unit, driving the compensation unit to the drive target position, determining whether or not to perform switching of the detection accuracy, and controlling the detection accuracy such that in a case where the compensation unit is driven in the first mode, the position of the compensation unit is detected with the first detection accuracy, and in a case where it is determined to perform switching of the detection accuracy, the position of the compensation unit is detected with the second detection accuracy even if the compensation unit is driven in the first mode.

According to a sixth aspect of the present invention, there is provided a method for controlling an optical apparatus that includes a compensation unit configured to compensate for a blur in an image formed by an imaging optical system, and changes shake compensation control depending on whether the optical apparatus is in a moving image capturing mode or in a still image capturing mode, the compensation unit being movable in a predetermined range in a case of the moving image capturing mode and being movable in a narrower range than in the moving image capturing mode in a case of the still image capturing mode. The method includes detecting a shake of the apparatus, detecting a position of the compensation unit with detection accuracy that is switchable between a first detection accuracy and a second detection accuracy that is higher than the first detection accuracy, calculating a drive target position of the compensation unit based on a shake amount that is an output of the detected shake and the position of the compensation unit, driving the compensation unit to the drive target position, determining whether or not to perform switching of the detection accuracy, and controlling the detection accuracy such that in the moving image capturing mode, the position of the compensation unit is detected with the first detection accuracy, and in a case where it is determined to perform switching of the detection accuracy, the position of the compensation unit is detected with the second detection accuracy even if image capturing is performed in the moving image capturing mode.

Further features of the present invention will become apparent from the following description of exemplary embodiments with reference to the attached drawings.

DESCRIPTION OF THE EMBODIMENTS

Below is a detailed description of embodiments of the invention with reference to the drawings.

Figure 1:
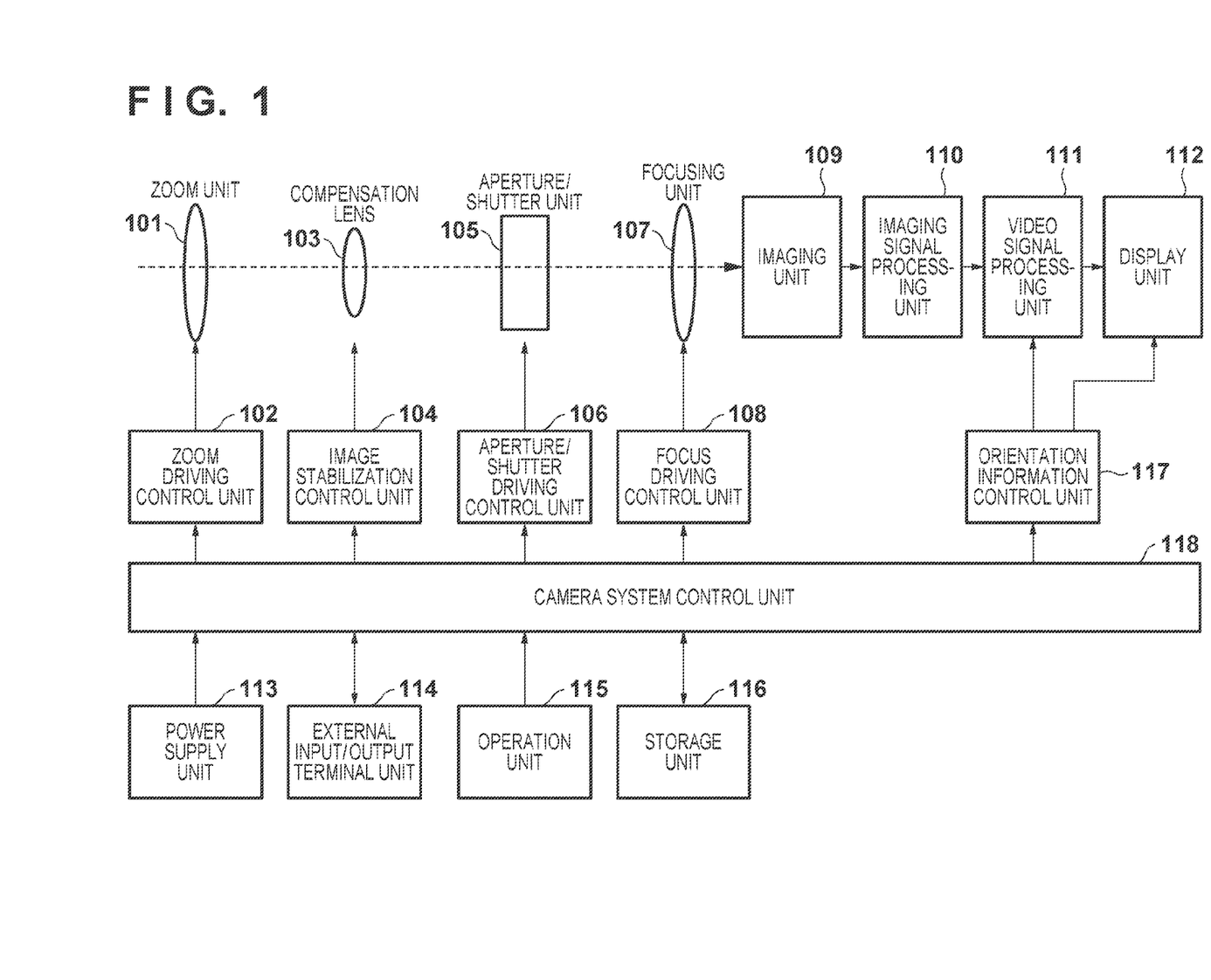
FIG. 1 is a block diagram of an imaging device according to an embodiment of the invention.

FIG. 1 is a block diagram showing a configuration of an optical apparatus according to an embodiment of the invention. This optical apparatus is primarily a digital camera for capturing still images and moving images.

In FIG. 1, reference numeral 101 denotes a zoom unit that includes a zoom lens for carrying out zooming. Reference numeral 102 denotes a zoom driving control unit that controls the driving of the zoom unit 101. Reference numeral 103 denotes a compensation lens (a shift lens or a compensation member) that can change its position in a direction perpendicular to an optical axis. Reference numeral 104 denotes an image stabilization control unit that controls the driving of the compensation lens 103.

Reference numeral 105 denotes an aperture/shutter unit. Reference numeral 106 denotes an aperture/shutter driving control unit that controls the driving of the aperture/shutter unit 105. Reference numeral 107 denotes a focusing unit that includes a lens for adjusting the focus. Reference numeral 108 denotes a focus driving control unit that controls the driving of the focusing unit 107. The zoom unit 101, the compensation lens 103, the aperture/shutter unit 105, and the focusing unit 107 described above are disposed inside an imaging lens for forming object images.

Reference numeral 109 denotes an imaging unit that converts a light figure that has passed through a group of lenses into an electric signal. Reference numeral 110 denotes an imaging signal processing unit that performs processing for converting the electric signal output from the imaging unit 109 into a video signal. Reference numeral 111 denotes a video signal processing unit that processes the video signal output from the imaging signal processing unit 110 according to the application. Reference numeral 112 denotes a display unit that displays an image as necessary based on the signal output from the video signal processing unit 111. Reference numeral 113 denotes a power supply unit that supplies power to the entire system according to the application. Reference numeral 114 denotes an external input/output terminal unit that carries out input and output of communication signals and video signals with an external device. Reference numeral 115 denotes an operation unit for operating the system. Reference numeral 116 denotes a storage unit that stores various types of data such as video information. Reference numeral 117 denotes an orientation information control unit that determines the orientation of the imaging device and provides orientation information. Reference numeral 118 denotes a camera system control unit that performs overall control of the system.

Next is a description of general operations of a digital camera with the above-described configuration.

The operation unit 115 includes an image stabilization switch (switching unit) that enables a user to select a shake compensation (image stabilization) mode. Examples of image stabilization modes include a normal mode in which shake compensation is performed within a normal compensation range and a dynamic mode in which shake compensation is performed within a range larger than the normal compensation range, in particular during moving image capture. Also, there is a shake compensation OFF mode in which shake compensation is not performed. In the case where one of the shake compensation modes is selected with the image stabilization switch, the camera system control unit 118 instructs the image stabilization control unit 104 to perform an image stabilization operation, and the image stabilization control unit 104, upon receiving this instruction, performs the image stabilization operation until receiving an instruction to turn off the image stabilization. The operation unit 115 also includes an imaging mode selection switch that enables selection of one of the still image capturing mode and the moving image capturing mode, and in each image capturing mode, it is possible to change operating conditions for each actuator.

The operation unit 115 includes a shutter release button configured to turn on a first switch (SW1) and a second switch (SW2) in stages according to the amount of pressing the button. A configuration is such that the switch SW1 is turned on when the shutter release button is pressed down about halfway, and the switch SW2 is turned on when the shutter release button is pressed down fully. When the switch SW1 is turned on, the focus driving control unit 108 drives and causes the focusing unit 107 to adjust the focus, and the aperture/shutter driving control unit 106 drives and causes the aperture/shutter unit 105 to set an appropriate exposure amount. When the switch SW2 is turned on, image data obtained from the light figure exposed on the imaging unit 109 is stored in the storage unit 116.

The operation unit 115 further includes a moving image recording switch. A press of this switch starts moving image capturing, and another press of the switch during recording ends the recording. The operation unit 115 also includes a playback mode selection switch that enables selection of a playback mode. In the playback mode, the image stabilization operation stops.

The operation unit 115 further includes a zooming switch that gives an instruction to perform zooming. When a zooming instruction is given with the zooming switch, the zoom driving control unit 102 receives this instruction via the camera system control unit 118 and drives the zoom unit 101 so that the zoom unit 101 is moved to the zoom position instructed. Along with this, the focus driving control unit 108 drives and causes the focusing unit 107 to adjust the focus based on the image information that has been sent from the imaging unit 109 and processed by the respective signal processing units (110 and 111).

Figure 2:
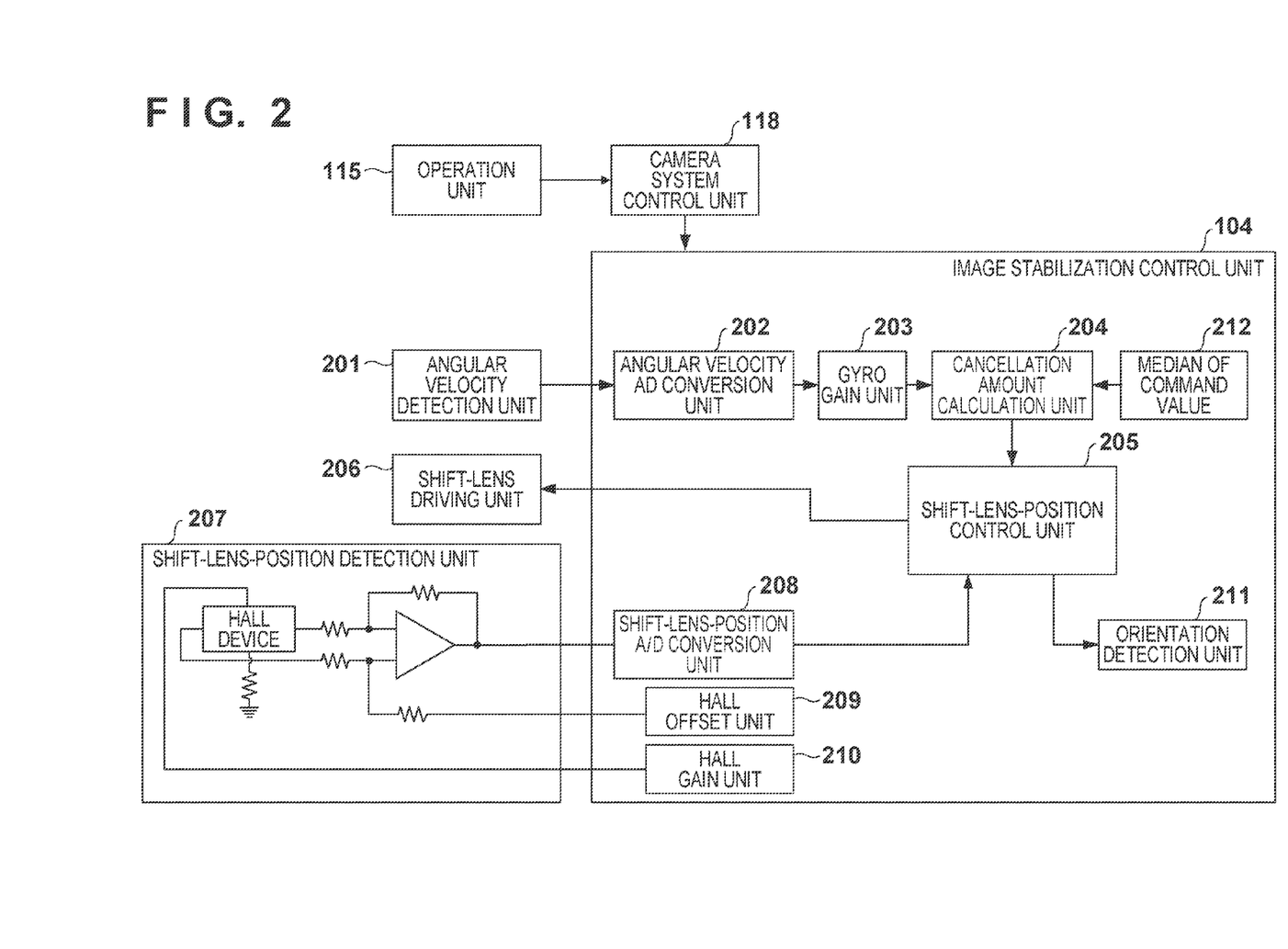
FIG. 2 is a block diagram of an image stabilization control unit according to an embodiment of the invention.

FIG. 2 is a block diagram illustrating details between the image stabilization control unit 104 and the camera system control unit 118. The configuration of FIG. 2 described below is a shake compensation system for performing image-blur compensation control.

The following description is given of only one of the axes in the pitch and yaw directions because the same configuration is applies to both of the axes. Reference numeral 201 denotes an angular velocity detection unit (hereinafter referred to as a "gyroscope") that detects angular velocity data and outputs the detected data as a voltage. Reference numeral 202 denotes an angular-velocity AD conversion unit that converts the data output from the gyroscope 201 into digital data.

Reference numeral 203 denotes a gyro gain unit that serves as an output adjustment unit for reducing variations in the output of the gyroscope. Reference numeral 204 denotes a cancellation amount calculation unit that calculates a shake cancellation amount by integrating and converting angular velocity data into angle data and, using inverted data of the camera shake angle data as camera shake cancellation data, changing properties in accordance with the driving range of the compensation lens 103. In this case, a drive target value (command value) is obtained by adding the shake cancellation amount to a median 212 of the command value. Here, the range of the command value is equivalent to an AD value of the shift lens. The data output from the cancellation amount calculation unit (target-position calculation unit) is notified to a shift-lens-position control unit 205.

Reference numeral 207 denotes a shift-lens-position detection unit that detects information indicating the position of the shift lens in a direction perpendicular to the optical axis and outputs the detected information as a voltage. A Hall device is used in the present example, but other detection means may be used instead. Reference numeral 208 denotes a shift-lens-position AD conversion unit that converts the data output from the shift-lens-position detection unit 207 into digital data.

The shift-lens-position control unit 205 takes a difference between the shake cancellation amount and the position data detected by the shift-lens-position AD conversion unit 208, and performs feedback control so that the deviation of that difference approaches zero. Ultimately, a signal for driving the compensation lens 103 is notified to a shift-lens driving unit 206. Upon having been notified of the driving signal, the shift-lens driving unit 206 drives the compensation lens 103 by the amount indicated by the signal.

Reference numeral 209 denotes a Hall offset unit. The Hall offset unit 209 is capable of adjusting the position of the shift lens by applying a voltage to a unit for amplifying the output of the Hall device and thereby giving a voltage offset to the amplified output of the Hall device.

Reference numeral 210 denotes a Hall gain unit. The Hall gain unit 210 controls the output of the Hall device by applying a predetermined voltage to an input of the Hall device. Reference numeral 211 denotes an orientation detection unit that determines, in the present embodiment, the orientation of the optical apparatus based on the information obtained from the shift-lens-position control unit 205. Note that the orientation detection unit 211 may use a sensor, such as an acceleration sensor or an orientation sensor, in order to determine the orientation of the apparatus.

Now, Hall offset adjustment performed using the Hall offset unit 209 and Hall gain adjustment (setting of AD resolution for shift lens position) performed using the Hall gain unit 210 will be described in detail. Hereinafter, the Hall offset adjustment and the Hall gain adjustment are collectively referred to as "Hall adjustment".

Figure 3A:
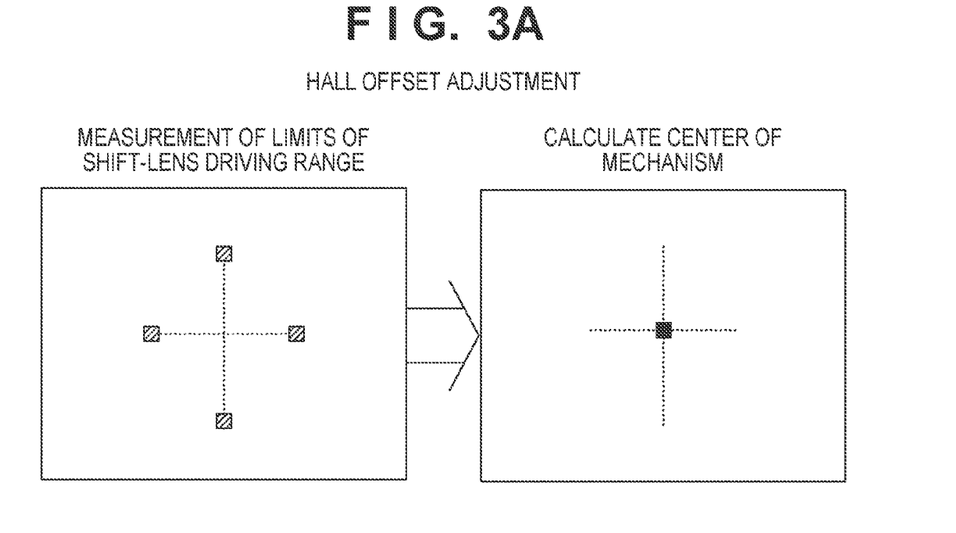
FIGS. 3A and 3B are schematic diagrams illustrating Hall adjustment according to an embodiment of the invention.

A method for calculating the center of a mechanism for moving the shift lens using the Hall offset unit 209 includes notifying the Hall offset unit 209 of a command to move, such as driving the shift lens to the limits in the horizontal and vertical directions in a plane of the driving range of the mechanism, and thereby driving the shift lens. In this case, the midpoint of these limits in the driving range is the center of the mechanism (the Hall offset adjustment refers to obtaining the center of the mechanism using the Hall offset unit 209 in this way). The central position of the shift lens obtained as a result is referred to as the "center of the mechanism" and serves as the central position of driving during image stabilization (see FIG. 3A).

Figure 3B:
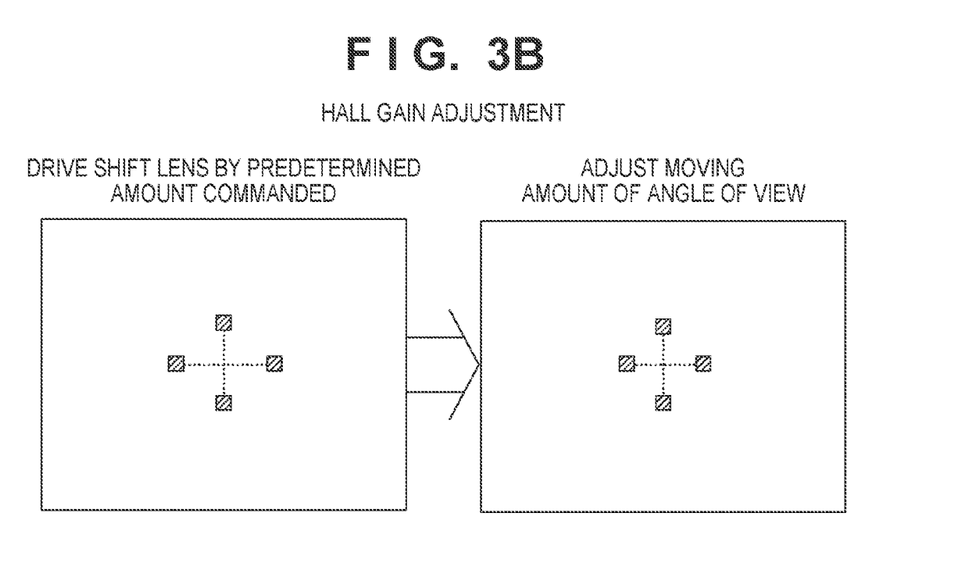

Next, a method for setting the AD resolution for shift lens position (detection accuracy for shift lens position) using the Hall gain unit 210 will be described with reference to FIG. 3B. First, the shift-lens-position control unit 205 is notified of a command to move, such as driving the shift lens by a predetermined amount (e.g., 50 LSB) in the horizontal and vertical directions in a plane of the driving range of the mechanism, and thereby the shift lens is driven. In this case, the value of the Hall gain unit 210 is set such that the variation between angles of view is 0.1 degrees. The value obtained as a result is called a "Hall gain value", and this adjustment is called "Hall gain adjustment". The AD resolution for shift lens position refers to by how many LSBs the shift lens is driven per 0.1 degree shift in the angle of view in the Hall gain adjustment. In the present embodiment, this AD resolution for shift lens position is used as control accuracy (detection accuracy). Note here that the Hall adjustment is performed at the telephoto end position.

Figure 4A:
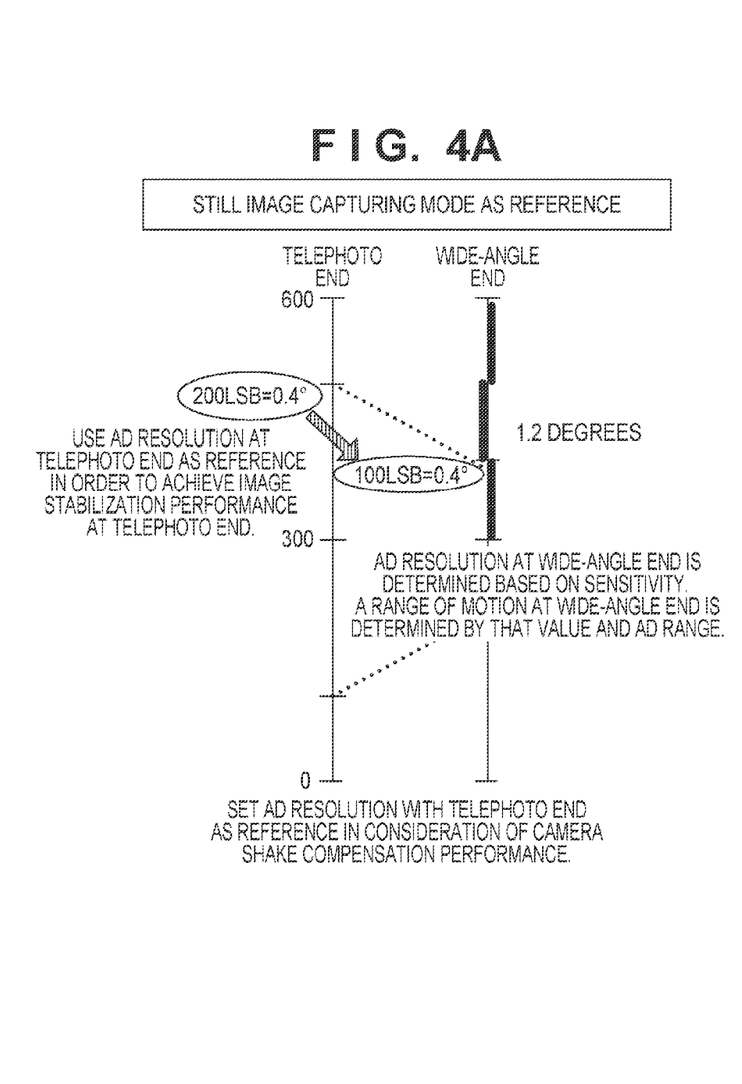
FIGS. 4A and 4B are diagrams illustrating details of AD resolution according to an embodiment of the invention.
Figure 4B:
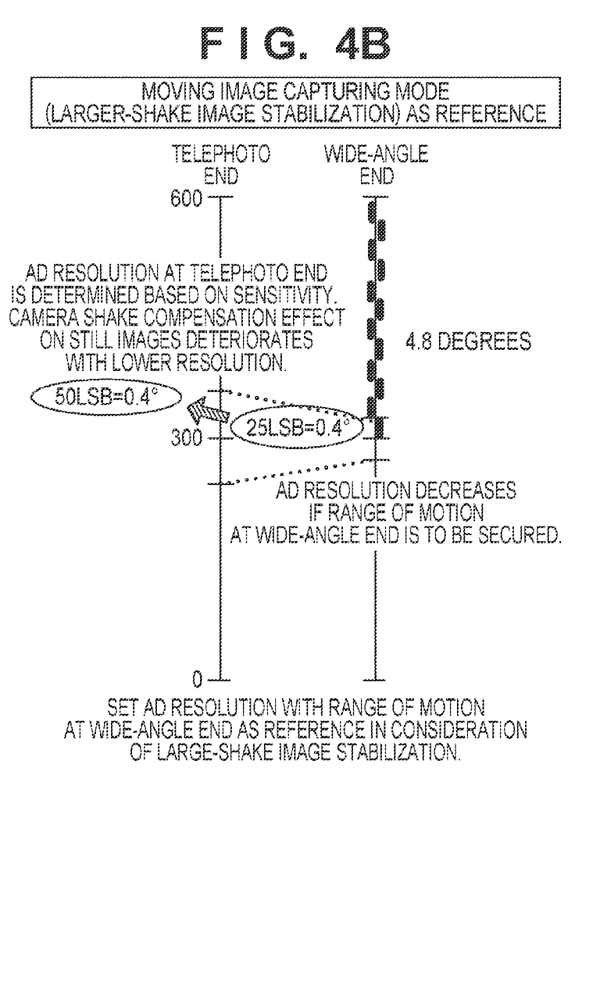

FIGS. 4A and 4B show an example of the AD resolution for shift lens position. The AD range of the shift lens is assumed to be from 0 to 600, with 300 being the central position. In the case of using the still image capturing mode as a reference as shown in FIG. 4A, it is assumed that, as a result of the Hall gain adjustment, in the case where the angle of view at the telephoto end changes by 0.4 degrees, the drive amount of the shift lens is set to 200 LSBs. Here, as high as possible a resolution is to be set at the telephoto end because a higher AD resolution for shift lens position is more advantageous for camera shake compensation during still image capture.

Here, the AD resolution at the wide-angle end is determined by a difference in the moving amount of the shift lens per predetermined variation in the angle of view between the telephoto end and the wide-angle end (hereinafter this moving amount is referred to as "shift lens sensitivity"). The value of this shift lens sensitivity varies depending on the structure and type of the lens.

For example, in the case of a given low-power lens, if the ratio in the shift lens sensitivity between the telephoto end and the wide-angle end is 2:1 and the AD resolution for shift lens position per 0.4 degree variation in the angle of view at the telephoto end is 200 LSBs, the AD resolution for shift lens position at the wide-angle end is 100 LSBs. In this case, due to the limitations of the AD range, the range of motion of the shift lens at the wide-angle end is plus or minus 1.2 degrees. With these settings, if large-shake image stabilization is performed in the moving image capturing mode, the AD range is insufficient and it is not possible to support large shakes occurring, for example, when shooting while walking.

In view of this, if the AD resolution is set such that a larger range of motion such as 4.8 degrees is taken at the wide-angle end (25 LSBs per 0.4 degrees) in order to support large-shake image stabilization in the moving image capturing mode as shown in FIG. 4B, this time the AD resolution at the telephoto end becomes low (50 LSBs per 0.4 degrees). With these settings, if the mode is switched to the still image capturing mode and still image capturing is performed, the effect of camera shake compensation is reduced.

Here, regarding camera shake image stabilization in the case where the AD resolution for shift lens position is reduced in the moving image capturing mode, a decrease in the effect of camera shake image stabilization during moving image recording is less prominent than during still image recording, and even if the AD resolution is reduced to a certain extent, there is almost no deterioration in appearance. One of the reasons is that since still images require higher image quality than moving images, the number of pixels to be recorded during still image recording is greater than that during moving image recording. Also, from the viewpoint of image quality, deterioration in the resolution of moving images is less evident than that in the resolution of still images.

As described above, there is the problem that if the AD resolution for shift lens position is adapted to that for still image capture, the range of motion of the shift lens cannot be secured during moving image recording, and if the driving range is adapted to that required for the shake compensation function during moving image capture, the effect of camera shake compensation is reduced during still image capture.

Figure 5A:
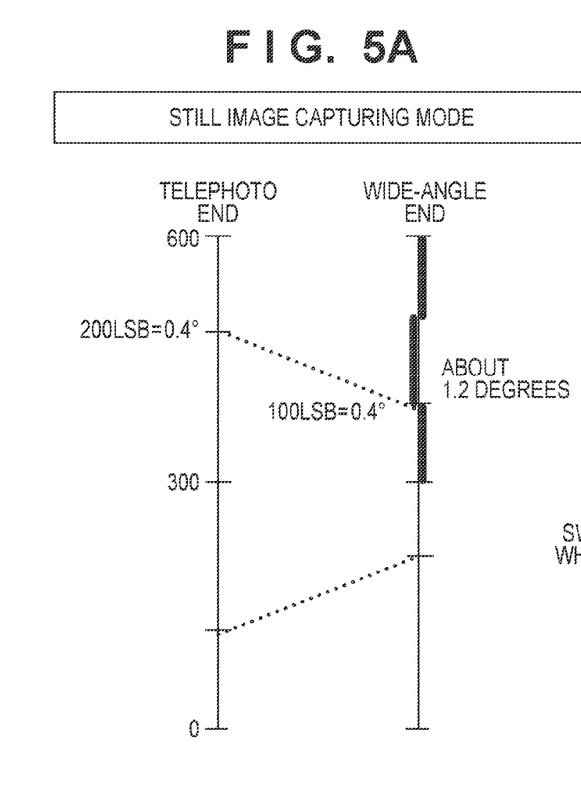
FIGS. 5A and 5B are diagrams illustrating switching of the AD resolution between a still image capturing mode and a moving image capturing mode according to an embodiment of the invention.
Figure 5B:
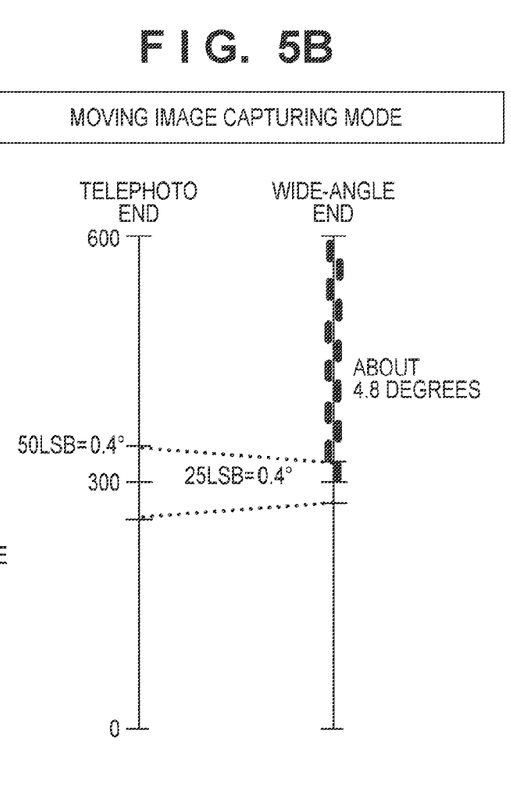

Accordingly, in the present embodiment, a unit (switching unit) is provided that switches the AD resolution for shift lens position when switching between the still image capturing mode and the moving image capturing mode as shown in FIGS. 5A and 5B. A switching method includes changing the Hall gain value (analog gain). Note that a mode in which shake compensation is performed with the AD resolution for shift lens position (first resolution or first detection accuracy) for the moving image capturing mode is assumed to be a first mode, and a mode in which shake compensation is performed with the AD resolution for shift lens position (second resolution or second detection accuracy) for the still image capturing mode is assumed to be a second mode. The AD resolution for shift lens position for the second mode is set to be higher than that for the first mode. Note that the AD resolution for shift lens position may be switched depending on the range of shake compensation. For example, a dynamic mode in which shake compensation is performed in a larger range than in a normal mode may be assumed to be the first mode using the first detection accuracy (first resolution), and the normal mode or a shake compensation OFF mode may be assumed to be the second mode using the second detection accuracy (second resolution).

Here, a configuration is possible in which the switching of the AD resolution using the Hall adjustment value is performed at the start and the end of moving image recording, and the AD resolution for moving image capture is set only during moving image recording. Furthermore, a configuration is also possible in which, with a digital camera that does not have a switching function between the still image capturing mode and the moving image capturing mode, the AD resolution for still image capture is used during a normal standby mode, the switching of the control resolution is performed at the start and the end of moving image recording, and the AD resolution for moving image capture is set only during moving image recording.

The following describes the reason why not only the Hall gain adjustment value but also the Hall offset adjustment value are switched when switching the AD resolution. In terms of circuit configuration, a change in the Hall output voltage value for a change of one LSB in the Hall offset adjustment value is a fixed value. In the case where the AD range of the shift lens per 0.4 degrees is set by Hall gain adjustment, the range of the Hall output voltage per 0.4-degree angle of view is also determined. Here, for example, the voltage range for the AD range of 200 LSBs per 0.4 degree is fourfold larger than that for the AD range of 50 LSBs per 0.4 degree, and therefore, the amount of angle of view to be compensated for per 1-LSB Hall offset value also differs by four times. Accordingly, if the Hall gain value is changed, a Hall offset value corresponding to that Hall gain value also differs. As a result, both the Hall gain adjustment value and the Hall offset adjustment value need to be changed in order to change the AD resolution.

However, it is not limited that the AD resolution is always switched to that for moving image capture (first resolution or first detection accuracy) during moving image capture. For example, in the image stabilization OFF mode, the shift lens is fixed at the central position and therefore, it is not necessary to widen the range of motion and to switch the AD resolution to that for moving image capture (first resolution or first detection accuracy). Similarly, even if the image stabilization mode is ON, in the case where the shake amount is small such as where the camera is fixed on a tripod, it is not necessary to take a large driving range of the shift lens. In this case, it is also not necessary to downgrade the AD resolution from that for still image capture (second resolution or second detection accuracy) to that for moving image capture (first resolution or first detection accuracy). In addition, it is preferable that the AD resolution is not switched unless otherwise necessary because the switching causes discontinuity of control of the shift lens.

Figure 6:
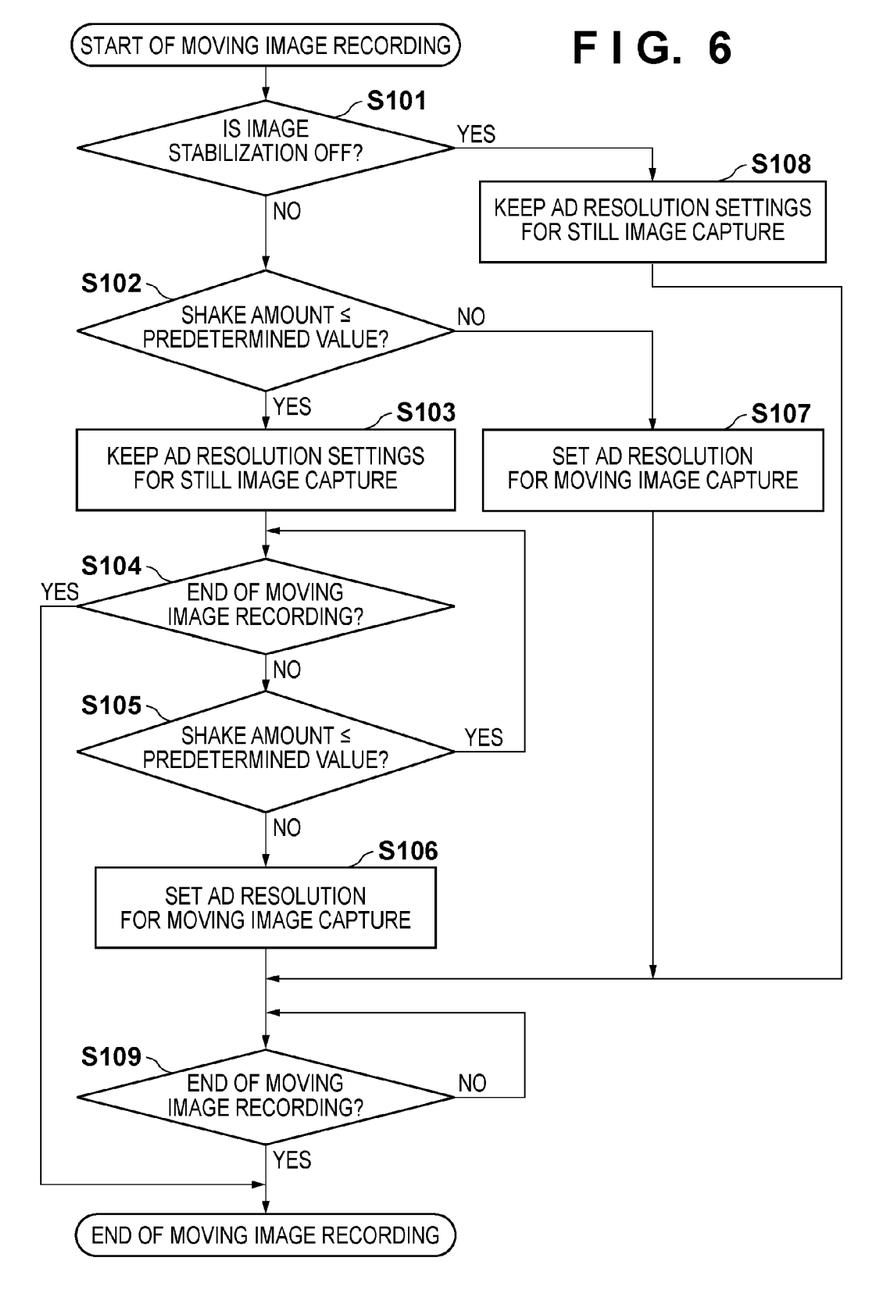
FIG. 6 is a flowchart showing the switching of the AD resolution according to an embodiment of the invention.

In view of these circumstances, FIG. 6 shows a flowchart of switching the AD resolution during moving image recording. In FIG. 6, it is assumed that the AD resolution for still image capture (second resolution or second detection accuracy) is being set during normal standby during which neither still image recording nor moving image recording is performed, and the AD resolution is switched at the start and the end of moving image recording so that the AD resolution for moving image capture (first resolution or first detection accuracy) is set only during moving image recording.

First, at the start of moving image recording, whether or not the image stabilization mode is OFF is determined in step S101. If the image stabilization mode is OFF, the shift lens is fixed at the center during moving image recording and therefore it is determined that there is no need to widen the driving range of image stabilization (switching determination). Then, while keeping using the AD resolution for still image capture (second resolution or second detection accuracy) (S108), moving image recording is performed until the end of the moving image recording (S109).

If the image stabilization mode is ON and a dynamic mode has been selected, it is determined whether or not the camera shake amount at that time is equal to or less than a predetermined value (S102). A conceivable example of the method for obtaining the threshold value for the shake amount is detecting the magnitude, amplitude, and frequency of a waveform of camera shake. For example, the threshold value for the shake amount may be the magnitude of the camera shake waveform that is on the order of the camera shake amount occurring when a user holds the camera while standing still during normal still image capture (e.g., 0.3 degrees), or the shake amount for which image stabilization is possible using the AD resolution for still image capture (second resolution or second detection accuracy). Furthermore, threshold values applicable to tripod processing may be used and it may be determined whether or not the amplitude and frequency of the camera shake waveform are equal to or less than their corresponding threshold values. In this way, various settings are possible depending on the application. Furthermore, a drive command value (a drive target value of the compensation lens 103) and the AD value of the shift lens (the position of the compensation lens 103) as well as the shake amount may be used as criteria.

In the case where the shake amount is greater than the predetermined value, the procedure proceeds to step S107, in which the AD resolution for still image capture (second resolution or second detection accuracy) is switched to the AD resolution for moving image capture (first resolution or first detection accuracy). After the switching has been performed, moving image recording is performed until the end of the moving image recording (S109).

If the shake amount is equal to or less than the predetermined value in step S102, the procedure proceeds to step S103, in which moving image capturing starts while keeping using the AD resolution for still image capture (second resolution or second detection accuracy). After the start of the moving image recording, if it is determined in step S104 to be the end of the moving image recording, the moving image recording ends while keeping the AD resolution for still image capture (second resolution or second detection accuracy). In this case, the switching of the AD resolution is not performed at the start and the end of the moving image recording.

If it has been determined in step S104 that it is not the end of the moving image recording and the recording further continues, the determination of whether or not the shake amount is equal to or less than the predetermined value is performed again in step S105. Here, the determination of whether or not the shake amount is equal to or less than the predetermined value may be performed periodically (e.g., at 1-ms intervals) or may be performed while constantly observing the shake amount. If it has been determined that the shake amount is equal to or less than the predetermined value, the shake amount continues to be observed thereafter until the end of the moving image recording, and if the shake amount remains equal to or less than the predetermined value until the end of the moving image recording, the AD resolution for still image capture (second resolution or second detection accuracy) is used. Thus, also in this case, the switching of the AD resolution is not performed during moving image recording. If it has been determined in step S105 that the shake amount is greater than the predetermined value during moving image recording, the procedure proceeds to S106, in which the AD resolution for still image capture (second resolution or second detection accuracy) is switched to the AD resolution for moving image capture (first resolution or first detection accuracy). Thereafter, moving image recording is performed until the end of the moving image recording (S109).

According to the above processing, in the case where it is not necessary to switch the AD resolution at the start and the end of moving image recording and during moving image recording, moving image recording is performed with the AD resolution for still image capture. This avoids discontinuity during control of the shift lens, which may occur when switching the AD resolution unnecessarily, thereby achieving optimum image stabilization control.

The above has been a description of preferred embodiments of the present invention, but the present invention is not intended to be limited to these embodiments, and various variations and modifications are possible within the scope of the invention. For example, a mechanism for driving an imaging element instead of the shift lens may be used. Also, although the present invention uses a digital camera as an example of the optical apparatus, the optical apparatus may be a digital video camera, an interchangeable lens for a single-lens reflex camera, or an electronic apparatus such as a mobile phone or game machine that is equipped with a shake compensation mechanism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279876, filed Dec. 15, 2010, which is hereby incorporated by reference herein in its entirety.

What is claimed is:

1. An optical apparatus comprising:
a compensation lens configured to compensate for a blur in an image formed by an imaging optical system by moving in a first direction different from an optical axis;
a shake detector configured to detect a shake of the apparatus;
a position detector configured to detect a position of said compensation lens in the first direction;
a calculator configured to calculate a drive target position of said compensation lens based on a shake amount that is output from said shake detector and the position of said compensation lens;
a driver configured to drive said compensation lens to the drive target position; and
a position controller configured to make a positional resolution of said compensation lens in the first direction in still image capturing be higher than a positional resolution of said compensation lens in the first direction in moving image capturing,
wherein in moving image capturing, said position controller makes the positional resolution of said compensation lens in the first direction when the shake amount is equal to or less than a predetermined value be higher than the positional resolution of said compensation lens in the first direction when the shake amount is greater than the predetermined value.

2. The apparatus according to claim 1, wherein said position detector detects position information of said compensation lens in the first direction and outputs the position information as a voltage signal.

3. The apparatus according to claim 1, further comprising an AD converter configured to convert the voltage signal into digital data.

4. The apparatus according to claim 1, wherein in moving image capturing, said position controller makes the positional resolution of said compensation lens in the first direction when the shake amount is equal to or less than the predetermined value be equal to the positional resolution of said compensation lens in the first direction in still image capturing.

5. A method of controlling an optical apparatus having a compensation lens configured to compensate for a blur in an image formed by an imaging optical system by moving in a first direction different from an optical axis, said method comprising;
shake detection step of detecting a shake of the apparatus;
position detection step of detecting a position of the compensation lens in the first direction;
calculation step of calculating a drive target position of the compensation lens based on a shake amount that is output from said shake detection step and the position of the compensation lens;
driving step of driving the compensation lens to the drive target position; and
control step of making a positional resolution of the compensation lens in the first direction in still image capturing be higher than a positional resolution of said compensation lens in the first direction in moving image capturing,
wherein in moving image capturing, said control step makes the positional resolution of the compensation lens in the first direction when the shake amount is equal to or less than a predetermined value be higher than the positional resolution of the compensation lens in the first direction when the shake amount is greater than the predetermined value.

6. An optical apparatus comprising:
a compensation lens configured to compensate for a blur in an image formed by an imaging optical system by moving in a first direction different from an optical axis;
a shake detector configured to detect a shake of the apparatus;
a position detector configured to detect a position of said compensation lens in the first direction;
a calculator configured to calculate a drive target position of said compensation lens based on a shake amount that is output from said shake detector and the position of said compensation lens;
a driver configured to drive said compensation lens to the drive target position; and
a position controller configured to control a positional resolution of said compensation lens in the first direction in moving image capturing,
wherein in moving image capturing, said position controller makes the positional resolution of said compensation lens in the first direction when the shake amount is equal to or less than a predetermined value be higher than the positional resolution of said compensation lens in the first direction when the shake amount is greater than the predetermined value.

7. A method of controlling an optical apparatus having a compensation lens configured to compensate for a blur in an image formed by an imaging optical system by moving in a first direction different from an optical axis, said method comprising;
shake detection step of detecting a shake of the apparatus;
position detection step of detecting a position of the compensation lens in the first direction;
calculation step of calculating a drive target position of the compensation lens based on a shake amount that is output from said shake detection step and the position of the compensation lens;
driving step of driving the compensation lens to the drive target position; and
control step of controlling a positional resolution of said compensation lens in the first direction in moving image capturing,
wherein in moving image capturing, said control step makes the positional resolution of the compensation lens in the first direction when the shake amount is equal to or less than a predetermined value be higher than the positional resolution of the compensation lens in the first direction when the shake amount is greater than the predetermined value.

* * * * *